J. D. WHITE.
COTTON CHOPPER.
APPLICATION FILED JUNE 17, 1916.
1,213,321.
Patented Jan. 23, 1917.
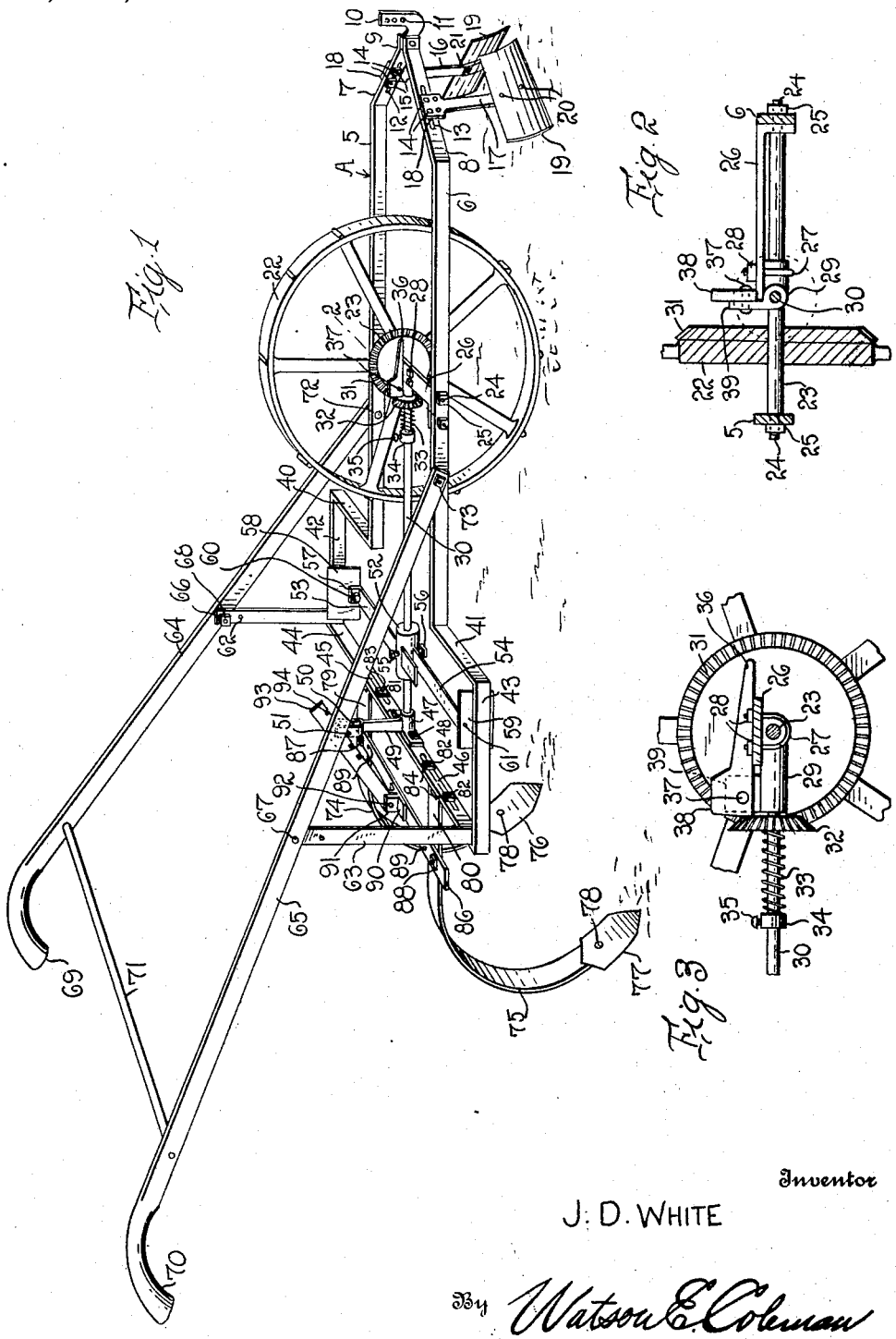
Inventor
J. D. WHITE
By Watson E. Coleman
Attorney

UNITED STATES PATENT OFFICE.

JEFFERSON D. WHITE, OF GORE, GEORGIA.

COTTON-CHOPPER.

1,213,321.

Specification of Letters Patent.  Patented Jan. 23, 1917.

Application filed June 17, 1916.  Serial No. 104,252.

*To all whom it may concern:*

Be it known that I, JEFFERSON D. WHITE, a citizen of the United States, residing at Gore, in the county of Chattooga and State of Georgia, have invented certain new and useful Improvements in Cotton-Choppers, of which the following is a specification, reference being had to the accompanying drawings.

This invention relates to certain improvements in cotton choppers and it is an object of the invention to provide a novel and improved device of this general character including resilient plow-carrying arms together with effective and convenient means for adjusting said arms.

The invention consists in the details of construction and in the combination and arrangement of the several parts whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a perspective view; Fig. 2 is an enlarged view partly in elevation and partly in section illustrating the mounting of the supporting wheel together with the shifting lever as herein embodied; Fig. 3 is an enlarged detail view of the gear and pinion shifting mechanism.

The chopper may be provided with a suitable frame A which may be used to designate the entire frame. This frame, as shown in Fig. 1 is preferably composed of a plurality of spaced members, two of which are indicated at 5 and 6 which are preferably in parallel relation. Forwardly directed from these members 5 and 6 are the angular members 7 and 8. These members 7 and 8 are joined together and form the front end or apex of the frame, as indicated at 9. This end of the frame 9 may be provided with any suitable means so that the chopper may be drawn over the ground in a proper fashion. One form of means is shown by the hook 10 which may be provided with a series of apertures 11, as shown.

Disposed in the members 7 and 8 are slots 12 and 13. These slots may be formed intermediate of the length of the members and so as to extend in a longitudinal direction with respect thereto. To coöperate with these slots, there are provided suitable bolts 14 and nuts 15. These bolts and nuts are adapted to pass through suitable apertures in depending stems 16 and 17. The upper ends of these stems may be flattened so as to provide bearing surfaces 18 so that when the bolts 14 are drawn out by means of the nuts 15, these bearing surfaces are maintained at any desired point on the members 7 and 8 according to position of the bolts 14 in the slots 12 and 13. Attached to the lower ends of the stems 16 and 17 are the curved scrapers 19 which may be secured to a curved portion of the stem in any suitable manner, one means being shown by the bolts 20 and the nuts 21. These scrapers are angularly disposed with reference to each other by means of the angular members 7 and 8 and their forward spaced relation depends upon the position of the bolts 14 in the slots 12 and 13. These scrapers may be brought practically together at their forward ends or may be drawn upward and separated from each other a suitable distance.

Disposed intermediate of the members 5 and 6, is a wheel 22 which may be of any usual or preferred type. This wheel is adapted to rotate on an axle 23. This axle may be provided with a shoulder and threaded ends 24 projecting therefrom. These ends 24 are adapted to pass through suitable apertures formed in the members 5 and 6 and to secure the frames in abutting engagement with the shoulder, the nuts 25 may be employed. Thus this axle acts as a bearing for the wheel 22 and also provides a means for stiffening the frame transversely between the members 5 and 6.

Extending from the frame member 6 is a plate 26 which may be secured at one end between the shoulder of the axle 23 and the frame member 6. This plate 26 extends over the axle 23 and adjacent the wheel 22, it may be secured to the axle in any convenient manner, one means being shown by the U-shaped clamp 27 and nuts 28. Adjacent the wheel 22 and positioned at right angles to the axle 23, there may be provided a suitable bearing 29 to coöperate with the shaft 30 which extends longitudinally between the frame members 5 and 6. The wheel 22 has mounted on it or connected to it in any suitable manner, a gear 31. This gear is shown as being of the bevel type and is preferably mounted concentrically with the axle 23. To operate with this gear 31, a pinion 32 is employed which is mounted upon the shaft 30. This pinion 32 in this embodiment, it is preferred to make slidable on the shaft 30 and to accomplish this end, it may be splined thereon. To maintain this pinion in operative engagement with the gear 31, a resilient element 33 may be employed as shown. This resilient element 33 may be formed as a coil spring which surrounds and is carried on the shaft 30. One end of this spring abuts against the pinion 32 and the other against a collar 34. This collar 34 may be secured to the shaft 30, in any convenient way, one means being shown by the set screw 35. If desired, this collar may be formed integrally with the shaft 30.

To position the pinion 32 out of engagement with the gear 31, a lever 36 may be employed which has a pivotal connection, as shown at 37. Adjacent this pivotal connection the lever 36 may be formed so as to have a cam face 38 which, upon moving the lever will bear against the pinion 32 against the compression of the spring 33, whereupon a continued movement of the lever 36, the pinion will be maintained out of engagement. One end of this lever, adjacent the cam face may be formed with a face to lie at right angles to the longitudinal axis so that when the lever is positioned vertically, the larger end or cam face 38 will bear against the pinion 32 and the lever will be substantially immovable against the action of the spring 33. This pivotal connection 37 may be effected by means of an arm 39 which is shown as a continuation of the bearing 29 in Fig. 2.

The rear ends of the members 5 and 6 are connected to the members 40 and 41 which are shown extending at right angles to the members 5 and 6. Extending downward from these members 40 and 41 are the members 42 and 43 which are formed preferably at right angles to the members 40 and 41 and continue in a parallel plane to that of the members 5 and 6. These members 42 and 43 are connected together at the rear end by means of the cross rail or tie 44. These members may be securely connected together with each other in any convenient manner or they may be formed of strip material bent to shape as shown. This cross member 44 is provided with a plurality of elongated slots 45 and 46 disposed intermediate of its ends. Positioned substantially centrally of this member 44 is a bearing 47 which may be secured to the cross member 44 by means of the bolts 48, as shown. Extending upwardly from this bearing 47 is an arm 49 which terminates in a forked end 50. In the forked ends, there may be provided suitable apertures in alinement to receive a bolt 51. The bearing 47 is employed to receive the rear end of the shaft 30.

Positioned on the shaft 30 is a cylindrical member 52. This cylindrical member may be secured to the shaft in any convenient way such as by casting it on or being formed on in "turning". This cylindrical member is provided with transverse slots which may be of rectangular form and extends transversely through the member. These slots are adapted to receive the radial arms 53 and 54 which are shown as being rectangular in form so that they may coöperate with the slots formed in the cylindrical member 52. To hold and securely maintain these arms at predetermined points of their length, suitable means such as the set screws 55 and 56 are provided. These radial arms, as shown, terminate in an angularly bent end 57 which is provided with an aperture. This end forms a bearing against which the hoes 58 and 59 may rest. These hoes 58 and 59 may be provided with suitable apertures and to secure them to the radial arms 53 and 54, the bolts and including nuts 60 and 61 may be employed, as shown in Fig. 1.

At the juncture of the members 42 and 43 with the cross member 44, the two arms 62 and 63 are securely fastened. These arms project upwardly and are secured to the handle members 64 and 65 by means of the bolts 66 and 67. These bolts are held in their operative position by means of the nut 68. The members 64 and 65 terminate at their upper ends in the handles 69 and 70. Adjacent these handles 69 and 70, there is a stiffening or tie bar 71. This bar may be secured to the members 64 and 65, in any convenient manner that will maintain them in their spaced relation. The lower ends of these members 64 and 65 are connected to the frame members 5 and 6 by means of the bolts and nuts 72 and 73, as more particularly shown in Fig. 1.

Extending backwardly and downwardly from the cross member 44, are the resilient plow carrying members 74 and 75. These plow carrying members extend horizontally from the cross member 44 and then curve downwardly and at the lower ends there may be secured the plows 76 and 77. These plows may be secured to the members by means of the bolts 78, as shown. To connect the horizontal portions 79 and 80 of the plow carrying members 74 and 75 with the cross member 44, their ends may be suitably formed so as to coöperate with the bolts 81 and 82 which extend through the slots 45 and 46 formed in this cross member 44. To secure the plow carrying members 74 and 75 a predetermined distance apart, the nuts 83 and 84 may be employed which, when screwed up on the bolts 81 and 82, will bear against the cross member 44, adjacent the slots.

As the plow carrying members 74 and 75 are adapted to have some vertical movement, as well as the spacing apart, the spacing cross member 86 is provided which may be secured to the horizontal portions 79 and 80, by means of the bolts and nuts 87 and 88. This member 86 may be provided with a series of apertures 89, as shown more particularly in Fig. 1. Intermediate of this member 86 there is provided a bearing 90 which may be secured to this member 86 in any convenient way. This bearing 90 may be provided with an upstanding lug 91, through which there may be formed a suitable aperture. A pin or bolt 92 is adapted to pass through this aperture and securely hold the lower end of the regulating arm 93. This will provide a pivotal connection for this arm 93 with the plow carrying members 74 and 75. One edge of this arm 93 is provided with a series of notches 94 which are adapted to engage with the pin or bolt 51 which is carried in the forked end 50.

In practical operation, the scrapers are spaced apart a sufficient distance to straddle the rows. As the chopper is moved forward the wheel 22 rotates and if the lever 36 is placed in the proper position the pinion 32 will rotate the hoes 58 and 59 so that they will effectually chop up. As the pinion 32 is smaller than the gear 31, these hoes will revolve at a rather high rate of speed. When it is desired to stop the chopping operation, the lever 36 may be raised vertically so that the cam face 38 pushes back the pinion 32 and takes it out of engagement with the pinion 31. This pushing backward of the pinion 32 compresses the spring 33 between the pinion and the shoulder 34. The plows 76 and 77 may be used to dig in the ground at varying widths and of varying depths by means of the slots 45 and 46 formed in the cross member 44 and also by means of the regulating lever 93.

Minor changes in form and details of construction may be resorted to without departing from the spirit of my invention, or the scope of the appended claim.

Having thus described this invention, what I claim is:—

A cotton chopper comprising a wheel-supported frame, a driven shaft carried by the frame and provided with cutting means, resilient plow supporting arms secured to the frame and extending rearwardly thereof, a member connecting said arms, a regulating arm pivotally connected to the member, and an upstanding arm carried by the frame, said upstanding arm and pivoted arm being provided with coacting means whereby the resilient arms may be held at differing elevations.

In testimony whereof I hereunto affix my signature in the presence of two witnesses.

JEFFERSON D. WHITE.

Witnesses:
W. J. WHITE, Sr.,
WILLIE WHITE.

Copies of this patent may be obtained for five cents each, by addressing the "Commissioner of Patents, Washington, D. C."